United States Patent
Zafiroglu

(10) Patent No.: US 7,122,089 B2
(45) Date of Patent: Oct. 17, 2006

(54) METHOD OF MAKING A TEXTILE LAMINATE HAVING PILE-LIKE SURFACE

(75) Inventor: Dimitri P Zafiroglu, Centreville, DE (US)

(73) Assignee: DZS, L.L.C., Midlothian, VA (US)

( * ) Notice: Subject to any disclaimer, the term of this patent is extended or adjusted under 35 U.S.C. 154(b) by 136 days.

(21) Appl. No.: 10/455,594

(22) Filed: Jun. 5, 2003

(65) Prior Publication Data

US 2004/0247821 A1  Dec. 9, 2004

(51) Int. Cl.
*B32B 37/16* (2006.01)

(52) U.S. Cl. ........................ 156/85; 156/291; 156/292

(58) Field of Classification Search ................ 156/85, 156/291, 292, 72, 84; 428/88, 95, 96, 198, 428/910, 913
See application file for complete search history.

(56) References Cited

U.S. PATENT DOCUMENTS

| | | | | |
|---|---|---|---|---|
| 2,787,571 A | | 4/1957 | Miller ........................ 154/76 |
| 3,708,384 A | | 1/1973 | Carpenter .................... 161/65 |
| 3,729,353 A | * | 4/1973 | Stumpf et al. ................ 156/72 |
| 3,755,062 A | * | 8/1973 | Schirmer .................... 428/152 |
| 3,819,465 A | * | 6/1974 | Parsons et al. ............. 428/176 |
| 3,860,469 A | | 1/1975 | Gregorian et al. ............ 156/83 |
| 4,035,215 A | | 7/1977 | Goldstone .................... 156/245 |
| 4,371,576 A | | 2/1983 | Machell ........................ 428/92 |
| 5,707,710 A | | 1/1998 | Zafiroglu ...................... 428/151 |
| 5,965,232 A | | 10/1999 | Vinod .......................... 428/85 |
| 6,063,473 A | | 5/2000 | Zafiroglu ...................... 428/86 |
| 6,162,309 A | * | 12/2000 | Brodeur et al. ................ 156/72 |
| 6,872,445 B1 | * | 3/2005 | Vinod .......................... 428/220 |

FOREIGN PATENT DOCUMENTS

| | | |
|---|---|---|
| WO | 94/19523 | 9/1994 |
| WO | 99/19557 | 4/1999 |

* cited by examiner

*Primary Examiner*—Richard Crispino
*Assistant Examiner*—Barbara J Musser
(74) *Attorney, Agent, or Firm*—Jeffrey C. Lew

(57) ABSTRACT

A textile laminate for covering diverse substrates includes a backing layer to be placed adjacent to the substrate, a substantially non-shrinkable fibrous layer coextensive with the backing layer and an adhesive component to bind the fibrous layer to the backing layer. The adhesive component is activated to adhere the fibrous and backing layers only at selected bonding points in a pattern bond. The backing layer is a material adapted to irreversibly shrink by at least about 25% such that after the backing layer shrinks, the fibrous layer separates from the backing layer at locations away from the bonding points and forms pile-like loops that protrude in a direction normal to the plane of the textile laminate.

15 Claims, 4 Drawing Sheets

METHOD OF MAKING A TEXTILE LAMINATE HAVING PILE-LIKE SURFACE

FIELD OF THE INVENTION

This invention relates to a laminated composite textile covering material having an outer surface that exhibits pile-like textile quality. More specifically the invention pertains to a laminated composite formed by adhering fibers of a pile layer to a backing layer and laterally shrinking the backing layer to produce outwardly protruding pile-like fibrous loops.

BACKGROUND OF THE INVENTION

Pile type fabrics are textile products characterized by an exposed face that has fibers or groups of fibers, i.e., yarns, standing upright in the direction perpendicular to the plane of the product. In so-called loop piles the fibers form upstanding loops with the ends of the loops attached to a support and the bend of the loop presented outwardly from the support. In other, so-called, cut piles, the bends of the loops are shaved so that free ends of the fibers point outward from the support. Pile type fabrics are generally more resilient and abrasive resistant than textile products of similar composition that are formed from fibers that largely lie parallel to the plane of the textile product.

One method of fabricating conventional pile type fabrics uses adhesives to glue the fibers to the support. A variety of this method is called flocking. It involves depositing chopped fibers oriented with their ends penetrating to a shallow depth into a bed of adhesive. In general, flocked fabrics are too delicate to deploy in high energy absorbing utilities such as flooring products and have other drawbacks such as reduced options for coloring or texturing.

Other pile fabrics are made by mechanically attaching the fibers, such as by tightly weaving or knotting the fibers into a support sheet. These fabrics are more robust than flocked fabrics and can be made into carpets. However, the processes for making such mechanically attached pile fabrics are generally slow and expensive. Some pile fabrics, such as stitched, needled, knitted, and tufted piles, use both mechanical attachment and copious quantities of adhesive applied to the support on its side opposite the pile for increased fabric stability. Despite technological advances for making these, fabrication complexity and adhesive systems provided to reduce fabric weight contribute to high cost of manufacture.

Pile fabrics formed by crimping yarns and attaching them to a support sheet are also available.

U.S. Pat. No. 3,708,384 discloses pile fabric formed by sonically inducing fusion bonding thermoplastic yarns to a thermoplastic backing on a bond line formed in the cross machine direction. The composite is advanced in the machine direction while the yarn supply is pushed toward the previously formed bond line to form a crimped pile and these steps are repeated.

U.S. Pat. No. 2,787,571 discloses a process in which intertwined fibers in warp yarns are intermittently adhesive bonded to a stretched backing layer. The warp yarns are attached only where the surface of the fibers contact the backing. When the backing is relaxed, the unbonded segments of the warp yarn fibers are forced into upstanding pile loops.

My U.S. Pat. No. 5,707,710 discloses a composite sheet suited for artificial leather which is made by impregnating a fabric having an interior yarn network and an outer layer of well separated fibers that loop in and out of the yarn network with an elastomeric resin. The method of making the composite sheet involves stitchbonding, knitting or weaving a fabric with elastic yarns and contracting the fabric to increase the number of tie points per centimeter.

My International Publication No. WO 94/19523 discloses an abrasion-resistant composite sheet of a resin-impregnated fabric formed from a lightweight nonwoven fibrous layer attached to a contracted planar network of yarns.

Conventional pile structured fabrics share the basic problem that dust and dirt tend to penetrate into the interstices between the fibers or yarns forming the pile. These contaminants collect at the roots of the pile and promote bacterial growth that creates a health hazard. To remove the dirt and sanitize the product the pile elements must be bent and parted so as to provide access to a cleaning tool. Additionally, spilled liquids can flow through the pile to the substrate and cause delamination. Solid sublayers that block liquid from passing to the substrate exacerbate wetness at the pile roots. This can increase the growth of bacteria and prevent moisture escape from wet subflooring such as drying concrete, and thereby contribute to separation of the floor covering product from the subfloor.

Traditional pile structured products also frequently suffer from excessive matting, that is, the collapsing of the pile under the load or repetitively applied weights, such as that which results from heavy foot traffic applied to carpets. Matting causes the pile to compact that makes dirt removal more difficult and gives the product a flat, undesirable prematurely worn appearance. The customary solutions to matting of piles have been to utilize high denier fibers that are stiff and more resilient but which detract from softness of the surface, and to shorten the height or the pile and/or to pack the pile elements closely together to give each other support. Short pile structures tend to lack a plush feel and closely packed pile elements add to the gross weight and cost of the product.

Laminate structures with relatively dense and flat face layers to resist dust penetration and pile collapse have recently been developed. These include using dense fibrous structures that are partially or fully filled with a resin, as disclosed in U.S. Pat. No. 4,035,215 (Goldstone), and U.S. Pat. No. 6,063,473 (Zafiroglu) and a film to cover the pile, as disclosed in U.S. Pat. No. 3,860,469 (Gregorian et al.). These laminate structures also lack a plush textile feel and decorative diversity of traditional pile materials.

Certain products made of flat textile fabrics laminated onto adhesive layer-coated reinforcing underlayers are described in WO 99/19557 and U.S. Pat. No. 5,965,232 (Vinod). These provide improved resistance to dust infiltration and bacterial growth but lack the plush hand of pile structured fabric and are susceptible to delamination and edge-fraying.

U.S. patent application Ser. No. 10/307,186, which is hereby incorporated by reference herein, is directed to a textured composite having a fibrous outer layer bonded at selected parts of its area with an adhesive layer such that the fibers of the outer layer are fully embedded in the adhesive within the bonded parts. Elevated areas between the bonded parts are substantially adhesive free and have loop pile like qualities.

It is desirable to obtain a textile product that has densely populated, deep (i.e., tall element) pile structure that is simple and inexpensive to fabricate, provides enhanced blocking of dirt infiltration and resistance to bacterial growth, resistance to matting without using very high pile density and stiff pile yarns, is easily sanitized, and which can use a broader selection of fibrous materials than heretofore available while providing plush, resilient, soft textile feel and good abrasion resistant properties of true pile structure.

SUMMARY OF THE INVENTION

Accordingly, there is now provided a textile laminate comprising (a) a shrunken backing layer defining a first side of the laminate and further defining a geometric plane of the laminate and formed of a material adapted to shrink in at least one dimension parallel to the plane by more than about 25%, (b) a pile layer comprising an exposed stratum of a decorative fabric that defines a second side of the laminate and a cushioning stratum of a resilient fabric that is different from the decorative fabric, the cushioning stratum being positioned between backing layer and the exposed stratum in which the decorative fabric comprises substantially non-shrinkable fibers, and (c) an adhesive component activated to form a pattern of bond points between the pile layer and the backing layer, in which the pile layer has a buckled structure comprising pile-like loops between the bond points which loops protrude outward from the first side substantially normal to the plane.

There is also provided a textile laminate comprising (a) a shrunken backing layer defining a first side of the laminate and further defining a geometric plane of the laminate and formed of a material adapted to shrink in at least one dimension parallel to the plane by more than about 25%, (b) a pile layer defining a second side of the laminate and comprising substantially non-shrinkable fibers, (c) an adhesive component activated to form a pattern of bond points between the pile layer and the backing layer, and (d) a continuous blocking layer between the pile layer and the backing layer, in which the pile layer has a buckled structure comprising pile-like loops between the bond points which loops protrude outward from the first side substantially normal to the plane.

Still further the present invention provides a textile laminate comprising (a) a shrunken backing layer defining a first side of the laminate and further defining a geometric plane of the laminate and formed of a material adapted to shrink in at least one dimension parallel to the plane by more than about 25%, (b) a pile layer on a second side of the laminate and comprising substantially non-shrinkable fibers, and (c) an adhesive component activated to form a pattern of bond points between the pile layer and the backing layer, in which the pile layer has a buckled structure comprising pile-like loops between the bond points which loops protrude away from the backing layer substantially normal to the plane to a height above the bond points in the range of about 3–10 mm, and has a weight of about 250–1200 g/m$^2$, in which the pile layer is formed from a textile fabric precursor comprising fibers in the range of about 0.1 to about 10 denier per filament, having a density of about 0.1–0.4 g/cm$^3$, and having a weight of about 40 to about 400 g/m$^2$, and in which all of the fibers of the textile fabric precursor coextensive with the bond points are embedded within the adhesive component such that the bond points have a density of greater than about 0.7 g/cm$^3$.

This invention yet futher provides a method of making a textile laminate comprising the steps of (a) providing a material for a backing layer defining a first side of the laminate and having a substantially flat surface opposite the first side, the material being adapted to shrink in at least one dimension parallel to the surface, (b) providing a textile fabric precursor for a pile layer defining a second side of the laminate, precursor comprising substantially non-shrinkable fibers, (c) positioning the textile fabric precursor coextensively with the material, (d) placing an adhesive component between the material and the textile fabric precursor, (e) activating the adhesive component to form a pattern of bond points between the backing material and the textile fabric precursor, and (f) shrinking the material at least about 25% to form the backing layer and thereby moving the bond points toward each other to form the textile fabric precursor into a pile layer of loops of fibers protruding normal to the surface.

DETAILED DESCRIPTION OF THE INVENTION

Figure 1:
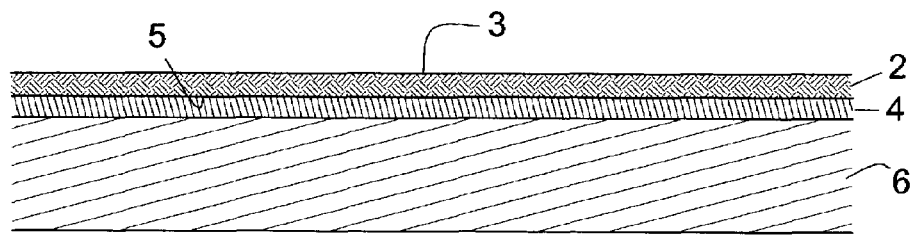
FIG. 1 is a schematic section view of a portion of a multilayer precursor to an embodiment of the novel textile laminate.

In a basic embodiment, the novel textile laminate has a pile structure comprised of a pile layer, a backing layer and an adhesive component which bonds the pile layer to the backing layer. FIG. 1 shows in schematic form a cross section of a multilayer precursor at a preliminary stage of fabrication of the embodiment. A textile fabric precursor to the pile layer 2 has an exposed face 3 and a layer of adhesive 4 positioned on the side 5 of the textile fabric layer opposite to the exposed face 3. A backing layer 6 is positioned coextensively with the pile layer adjacent to the adhesive layer. In this stage, the precursor layers are in contact as shown but the adhesive is not activated.

The textile fabric layer comprises substantially non-shrinkable fibers. In contrast, the backing layer comprises a shrinkable material that is selected to contract during the laminate fabrication process. Topographically, the backing layer is a macroscopically flat construct having length and width dimensions much larger than the thickness dimension. Occasionally the length and width dimensions are said to correspond with orthogonal "x" and "y" directions, respectively. Thus the x and y directions of the backing layer define a plane. The thickness dimension is occasionally said to correspond with the "z" direction which is normal to the x-y plane.

Figure 2:
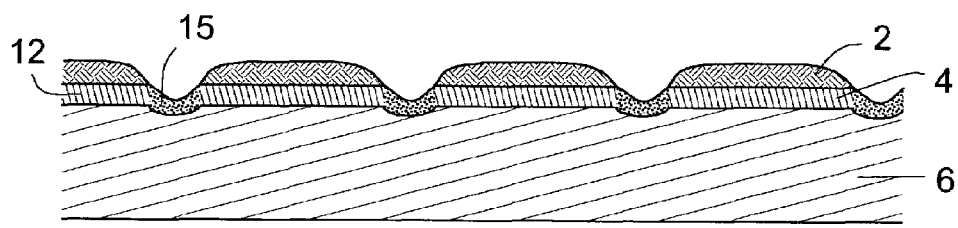
FIG. 2 is a schematic section view of the multilayer precursor of FIG. 1 after the adhesive component has been activated.

FIG. 2 illustrates the textile laminate at an intermediate stage of fabrication. The textile fabric layer 2, adhesive layer 4 and backing layer 6 remain juxtaposed as in FIG. 1, however, the adhesive component has been activated at selected bonding points 15. The activation has been achieved in such a way as to adhere the fibers of the textile fabric layer 2 to the backing layer 6 at the bonding points. The adhesive at positions 12 between bonding points 15 is not activated. Accordingly, the fibers of the textile fabric layer are not attached to the backing layer at positions 12 adjoining the bonding points.

Figure 3:
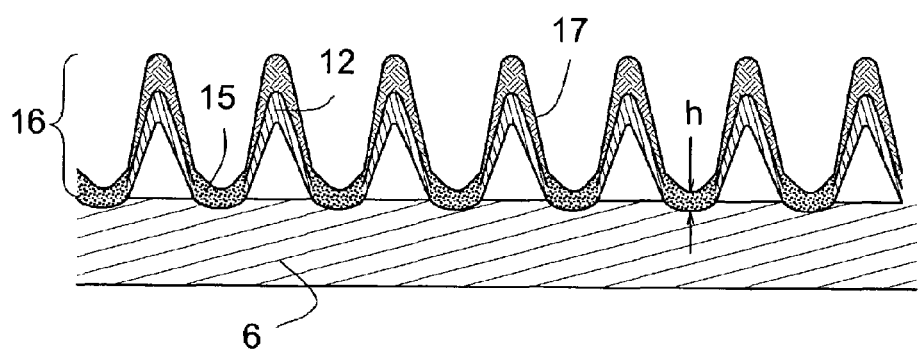
FIG. 3 is a schematic section view of the multilayer precursor of FIG. 2 after the backing layer has been contracted to provide an embodiment of the textile laminate in accord with the present invention.

In a later stage of fabrication the backing layer is caused to shrink in a direction parallel to the plane of the laminate. As seen in FIG. 3, after shrinking, the bonding points 15 have moved laterally toward each other. The backing layer may also shrink in the z direction, nevertheless, the backing layer largely remains flat. As mentioned, the fibers of the textile fabric layer are substantially non-shrinkable and are attached to the backing layer at the bonding points but not at positions 12. Therefore, as the backing layer contracts laterally, the textile fabric layer separates from the backing layer at positions 12, buckles at about mid-span between bonding points, and forms outwardly projecting loops 17. These loops are anchored at the bonding points, protrude normal to the plane of the backing layer and collectively form a pile layer 16.

The textile fabric layer 2 preferably has a weight of about 40–400 g/m² and preferably includes at least about 50 wt. % of substantially non-shrinkable fibers. By "substantially non-shrinkable" is meant that these fibers will largely, though not necessarily completely, maintain their dimensions, especially, the longitudinal dimension, when exposed to process conditions that are utilized to transform the precursor into the finished textile laminate. The fibers of layer 2 may shrink slightly, however, there should be a significant difference between the contraction in the axial direction of the fibers and the contraction of the shrinkable material of the backing layer. The fibers of the textile fabric layer are thus said to be significantly less shrinkable than the backing layer material. Preferably, the ratio of the contraction of the textile fabric layer material to the shrinking rate of the backing layer material should be less than about 0.65:1, more preferably less than about 0.5:1, and most preferably less than about 0.4:1.

Pile structure develops when the backing layer shrinks in at least one dimension parallel to the geometric plane defined by the backing layer. To achieve good pile development, the x-y plane area of the backing layer should shrink by at least 25%, that is to 75% or less of the uncontracted backing layer dimension prior to the start of the fabrication process.

Any mechanism that causes the backing layer to shrink while maintaining the difference in shrinking rates between the textile fabric layer and the backing layer is suitable. The preferred mechanism is heat shrinking. Thus it is primarily contemplated that shrinking is effected by heating the intermediate stage laminate precursor of FIG. 2 to an elevated, heat shrink temperature effective contract the backing layer. The shrinkage effected in the backing layer is irreversible. That is, the backing layer remains in its contracted state after the laminate has been cooled. The heat shrink temperature should be well above the anticipated service temperature of the product so that the laminate does not continue to shrink and distort further during its normal use. Also, the heat shrink temperature should be low enough to assure that the backing, the pile layer-forming fibers and the adhesive component do not excessively degrade, weaken or decompose during fabrication. The maximum heat shrink temperature will depend upon the physical properties of the textile fabric layer, adhesive and backing layer compositions.

Figure 4:
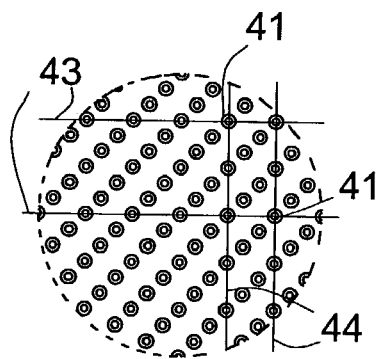
FIG. 4 is a schematic representation of a bond pattern as viewed normally toward the plane of a multilayer precursor of an embodiment of the novel textile laminate.

From the foregoing disclosure one may well appreciate that the adhesive component bonds the fibers of the textile fabric layer to the backing layer at discrete bonding points 15 located at selected positions on the area of the surface of the backing layer. The term "pattern bonding" is used to describe this feature and the bonding points are sometimes referred to as "pattern bonds". The pattern bonding can be geometrically ordered or randomized. By the term "geometrically ordered" is meant that the bonding points are placed at predetermined loci that define non-repetitive or repetitive schemes as the laminate is viewed in the z direction. A representative example seen in FIG. 4 in which the pattern bonds 41 lie at the intersections of imaginary lattice lines 43 and 44. The lattice lines can be oriented at oblique angles to each other. FIG. 4 illustrates a staggered alignment of bond points in the pattern. Spacing or alignment dimensions of the pattern bonds as shown in FIG. 4 is not critical.

Figure 5:
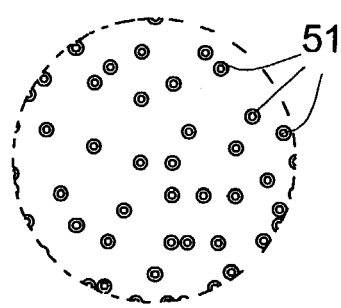
FIG. 5 is a schematic representation of another bond pattern as viewed normally toward the plane of a multilayer precursor of an embodiment of the novel textile laminate.

By "randomized" is meant that the positions of the individual bond points are not predetermined. FIG. 5 illustrates an example of randomized bonding points 51 that can be formed by placing adhesive onto random positions on the area of the backing layer, such as by spray application.

Figure 6:
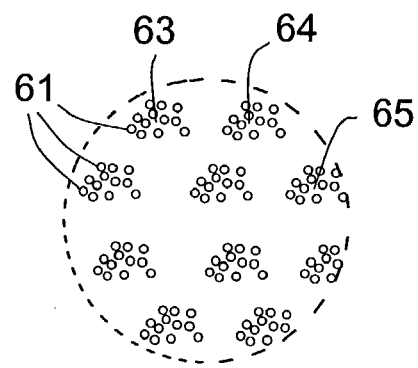
FIG. 6 is a schematic representation of another bond pattern as viewed normally toward the plane of a multilayer precursor of an embodiment of the novel textile laminate.

FIG. 6 illustrates another preferred bonding pattern for use in the present invention. The bond points 61 are spaced closely together in clusters 63, 64, 65 etc. The clusters are spaced apart by distances greater, than the distances between bond points within clusters. The bond points within clusters and the clusters themselves may be positioned independently in either an ordered or randomized pattern. This pattern bond is operative to produce pile height effects in the product laminate. That is, the height of the pile is low between the closely spaced bond points within clusters as compared to the height of the pile between clusters of bond points.

Figure 7:
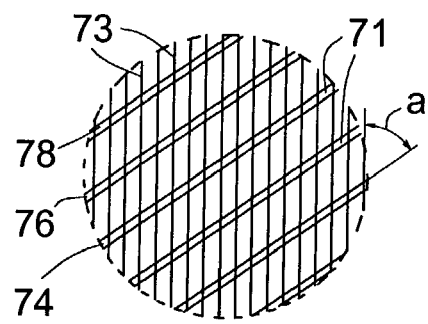
FIG. 7 is a schematic representation of another bond pattern as viewed normally toward the plane of a multilayer precursor of an embodiment of the novel textile laminate.

The bond pattern should provide sufficient spacing between bond points to induce formation of the pile structure during the shrinking part of fabrication. Preference is given to placing the bond points at discrete positions of the plane of the backing layer. However, in one embodiment illustrated in FIG. 7, the adhesive component 71 for the bonds can be arranged in continuous, spaced apart, substantially parallel lines. The adhesive points are arranged in parallel lines 74, 76, 78. This pattern bond is preferred for use with pile layers comprised primarily of warp yarns 73 that are aligned in a single direction and the angle a of alignment between the direction of the warp yarns and the parallel lines of the pattern bond is about 45–90°. If the angle between the lines of adhesive and the warp yarns is about 0–45°, all of the yarns which lie adjacent to the lines of adhesive will be fully adhered to the backing layer and will not buckle outward to become a pile-like structure. Similarly, the extents of yarns that lie between the parallel lines of adhesive will not be adequately adhered to the backing. It is recommended that the linear bond pattern illustrated in FIG. 7 should only include lines parallel to a single direction within a laminate because the bonding that occurs along the lines of adhesive tends to restrict contraction in the direction of the lines. Shrinkage of the backing layer is most pronounced in the direction perpendicular to the lines. If parallel bond lines in multiple directions are utilized, shrinkage of the backing layer can be inhibited to the extent that the pile-like layer structure does not form and/or the laminate can be distorted.

The pattern bonding effect can be created in a variety of ways. For example, the un-activated adhesive component can be deposited between the textile fabric layer and backing layer only at the precise locations where attachment of the layers is to occur. This can be accomplished, for example, by dropping, dusting, pouring, spraying, painting, printing or similar conventional method of depositing the un-activated adhesive at loci such as those shown in FIGS. 4–7. Then all of the adhesive is activated, for example by pressing the layered assembly between heated plates. Another method involves applying a continuous film of un-activated adhesive between the textile fabric and backing layers. The resulting layered assembly is then pressure laminated by causing adhesive activation at selected locations. Thermal embossing is a representative technique in which the layered assembly is placed in the nip between a backing tool and an embossing tool. The backing tool and/or the embossing tool are heated such that the tips of the protrusions of the embossing tool activate the adhesive component at or near the tips but leave the adhesive component distant from the tips un-activated. Thermal embossing techniques are more fully described in U.S. patent application Ser. No. 10/307,186.

In all cases, according to the present invention the whole structure of the textile fabric layer is embedded in adhesive such that the density of the laminate, including the adhesive component, backing material and fibers of the textile fabric, within the bond points is greater than about 0.7 g/cm$^3$. This densification of the mass within the bond points advantageously provides very strong attachment of the pile layer to the laminate and thereby enables the laminate to satisfy the stringent wear resistance specifications of modern floor covering materials. A convenient method of determining the density of the bond points is by cutting a cross section through the laminate at the center of a bond point. The height dimension "h" (FIG. 3) is measured with a calibrated microscope. The sum of the weights of the textile fabric precursor to the pile layer 2 and adhesive layer 4 (in consistent dimensional units) divided by the height dimension h provides the bond point density.

Spacing between the pattern bonds is an important variable in the fabrication of the novel pile-like textile laminate. The spacing between neighboring bonding points should be such that the pile layer protrudes substantially normal to the plane of the backing layer to a height above the bonding points in the range of about 2–10 mm, and preferably about 3–10 mm. Thus the distance between bonding points in the precursor assembly of layers prior to shrinking of the backing layer should be about 4–20 mm, preferably 6–20 mm.

Liquid or particulate form (i.e., powdered) adhesive can be applied onto the bonding surface of the backing layer, the textile fabric layer or both. Solid, continuous or semi-continuous adhesive can be laid between the textile fabric and backing layers.

The adhesive layer can be thermoplastic or thermosetting composition. Representative thermoplastic compositions suitable for the adhesive layers in this invention include polyolefins, such as polyethylene and polypropylene, and substituted polyolefins, such as vinylidene chloride (sometimes known by the tradename "Saran"). Fillers and additives can be added to the adhesive layer to modify the properties of the composite. Incorporation of fillers such as chalk increases stiffness without increasing melt viscosity. Pigments and other additives may be utilized. Polyesters and polyamides usually melt at too high at temperature for use as a thermoplastic adhesive. However, they can be modified by compounding with softer, lower-melting polymers to form a polymer alloy. These polyester or polyamide alloys have lower adhesive activation temperatures such that activation does not distort or degrade the fiber compositions used in the textile fabric outer layer. Therefore the alloys can be suitable for use as the adhesive compositions.

The backing layer can be any of a diverse variety of materials in which the backing layer precursor is shrinkable. Suitable backing layer structures include for example, warps, such as warps of partially oriented yarns (sometimes referred to as "POY"), woven, knit or stitch bonded fabrics containing POY, films, such as thermoplastic polymer films and woven, stitched knit or nonwovens of thermoplastic fibers, wovens prepared from slitted sheets of such thermoplastic polymer films and combinations thereof.

A preferred backing layer includes POY of polyesters that shrink to about 67–50% at temperatures greater than about 100° C. These fabrics can be contracted and heat-set to maintain the shrunken dimensions by exposure under area constraint to temperatures in the range of about 150–190° C. The resulting laminates are serviceable at temperatures up to about 130° C. Another suitable backing layer is a fabric that includes warps of polyester POY sandwiched between a low melt film and a layer of polyester fibers that are cross-lapped and needled into the warps and the film. Preference is also given to using backing layers formed from slit film yarns of polypropylene and polypropylene/polyester blends or from fabric stitchbonded with fully oriented polyolefin yarns. These structures can shrink without melting to about 65% when subjected to about 150–160° C. and also provide laminates that are stable in service up to about 130° C. Fibrous batting simply needled to a shrinkable film is another suitable backing layer material.

In many utilities, especially floor covering applications, it is desirable that the finished product be dimensionally stable. Accordingly for such applications the backing layer should be shrinkable irreversibly to prevent excessive stretching when the floor covering is installed. However, in other utilities a stretchable textile laminate is appropriate. Thus in another contemplated embodiment the shrinkable backing layer can be formed of elastic elements that have been stretched and temporarily set to releasably lock the elements in tension. At appropriate time, the locked tension is released and the elastic elements contract to provide the desired shrinkage. For example, the backing layer can comprise a thermoplastic nonwoven fabric stitched with tensioned elastomeric yarns that are partially melted, inter-bonded and heat set at a temperature which freezes the nonwoven without releasing the elastic energy in the tensioned yarns. During fabrication of the novel textile laminate, a non-shrinking textile fabric layer is pattern bonded to the "melt-locked" backing layer. Then the composite can be heated effectively to relax the thermoplastic nonwoven and thereby allow the elastic yarns to contract and shrink the backing layer. This product retains the ability to stretch under tension after completion of the shrinking step.

In addition to being significantly less shrinkable than the backing layer material, fibers of the textile fabric outer layer preferably is a substance that melts at a higher temperature than the activation temperature of the adhesive layer composition. Preferably the temperature differential should be greater than about 20° C., more preferably greater than about 50° C. and most preferably greater than about 100° C. Use of high melting temperature polymeric materials for the fibers is advantageous because it permits utilizing thermoplastic adhesive compositions that activate at higher temperatures. It also provides a composite that can function in higher temperature service environments. A low melting temperature fiber composition calls for use of a still lower activation temperature adhesive composition. The maximum product service temperature will then be limited by the adhesive activation temperature. Preferably the melting temperature of the fibers should be at least about 150° C. Fibers of thermoplastic synthetic polymer materials are suitable for use in the textile fabric outer layer in this invention. Representative examples of polymers for the fibers include polyesters, polyamides, polyaramids and combinations thereof. Polymers melting below 150° C., such as polyethylene and other polyolefins, can be used for the fibers provided that the adhesive composition has a suitably low melting temperature and that the expected service temperature is sufficiently below the adhesive melting temperature as to preserve product functionality. Thermosetting adhesive compositions that activate at low temperatures and are stable up to the fiber melting point can be utilized in combination with low melting fiber compositions. Natural fibers such as cotton and wool can also be used either free of, or blended with, synthetic polymer fibers.

Examples of stock suitable for the pile layer used in this invention are textile fabric that includes entangled nonwovens such as mechanically entangled (e.g., needle punched) and hydraulically entangled (e.g., spunlaced) products, spunbonded polyester nonwovens such as product sold under the tradename Reemay®, spunbonded polyolefin fabrics such as Typar® fabric, and spunbonded polyamide such as Cerex® spunbonded nylon fabric. Staple nonwovens containing thermoplastic binders are also suitable. Knit or woven fabrics can be used as well.

Advantageously, the novel textile laminate can be formed to provide a pile layer that has superior dust penetration resistance. Desirable degrees of dust impenetrability can be achieved by selecting the textile fabric layer material and forming the pile layer according to the following criteria. The size of the fibers in the textile fabric precursor (e.g., 2 FIG. 1) to the pile layer preferably should be in the range of about 0.1–10 denier per filament. The textile fabric layer precursor should have a weight in the range of about 40–400 g/m². The textile fabric precursor should be a substantially uniform structure having density of at least about 0.2 g/cm³. By "substantially uniform" is meant that the textile fabric precursor material is free of large discontinuities such as holes or agglomerated masses. Additionally, the pile density of the finished textile laminate, that is, overall weight divided by overall volume of the pile layer (e.g., 16 in FIG. 3) should be in the range of about 0.1–0.4 g/cm³ and the pile weight preferably should be in the range of about 100–1000 g/m².

In conventional pile fabric, the fibers of the pile are almost completely perpendicular to the plane of the fabric. Those fibers thus only individually present a fiber end cross section as a barrier to dirt penetration. Utilizing pile layer material of the type mentioned above presents a more complete barrier to flow of dirt and dirt particles entering from outside the pile layer in the z-direction and provides favorable dirt penetration resistance in the novel textile laminate.

In one aspect, the textile fabric layer utilizes a single stratum of fibers. The fibers in the single stratum can be all the same or they can be mixtures of different fibers, i.e., fibers having different chemical compositions and/or physical form. The mixtures can have any range of proportions of the component fiber types such that each of the different fiber types will contribute toward producing a desired set of physical properties in the pile layer of the finished product. Due to the intimate mixture of the different fiber types within the single stratum, the ability to provide a wide range of finished product properties is somewhat limited.

Figure 8:
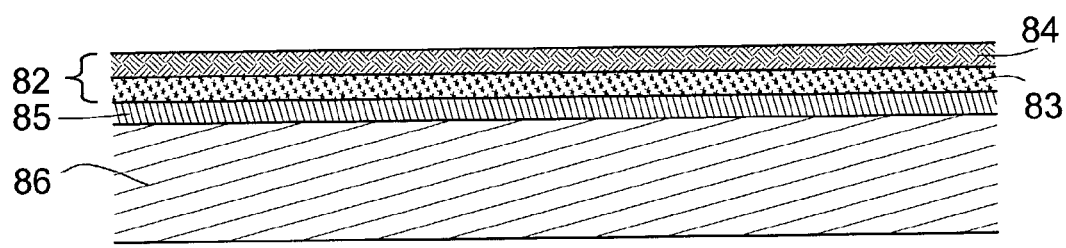
FIG. 8 is a schematic section view of a portion of a multilayer precursor to an embodiment of the novel textile laminate in which the pile layer comprises a plurality of fibrous strata.
Figure 9:
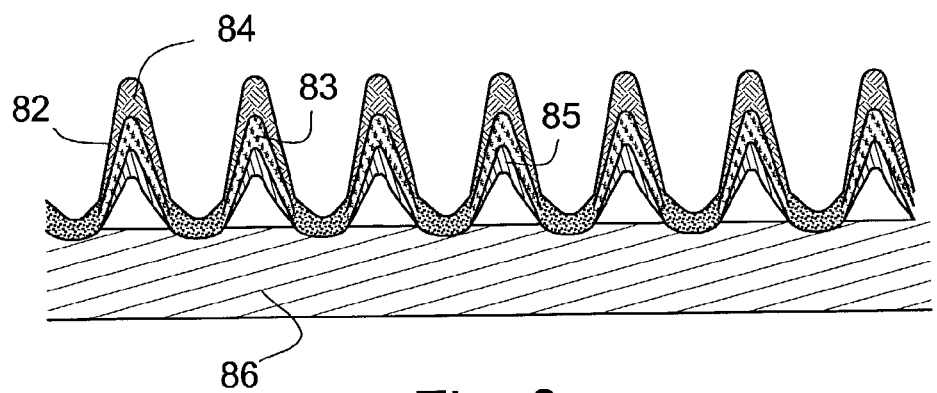
FIG. 9 is a schematic section view of the multilayer precursor of FIG. 8 after the backing layer has been contracted to provide an embodiment of the textile laminate in accord with the present invention in which the pile layer comprises a plurality of fibrous strata.

In a preferred embodiment, the textile fabric layer comprises a plurality of strata. The fibers in each stratum can be different from those in other strata. Moreover, the fibers in each stratum can be the same fibers or mixtures of different fibers. This embodiment can be further understood with reference to FIGS. 8 and 9. FIG. 8 shows the juxtaposition of the precursor textile fabric layer 82, adhesive component 85, and backing layer 86 assembled prior to activation of the pattern bonds. Layer 82 is comprised of multiple strata 83 and 84. Prior to formation of the laminate, the strata can be attached to each other, for example by an adhesive present at their mutual interface or the strata can be unattached to each other. FIG. 9 shows the structure of this product after the adhesive has been activated and the backing layer has been contracted. This embodiment features the enhanced ability to provide the pile layer with unique combinations of characteristics contributed by each of the constituent strata materials due to the stratification. That is, the outer stratum 84 can be tailored to provide appearance qualities while the inner stratum 83 is selected to provide additional structural qualities. Additionally, the underlying stratum is masked from view by the overlying outer stratum. It is thus possible to use structurally sound but visually unappealing, and therefore less expensive material, such as recycled carpet and recovered production waste in the inner stratum. In this manner, the multi-strata textile fabric layer product of this invention is rendered more economical to make and provides an outlet for waste material that would otherwise need to be discarded.

An example of this preferred embodiment is one in which the outer stratum can be formed of dense, soft fibers which impart a delicate, pleasant feel and the inner stratum can be made of a less dense, coarse and stiff fiber material that gives a resilient and cushioned support to the outer stratum. The soft outer stratum shields the coarse supporting inner stratum from view and touch of the user. Without the support from the stiffer, resilient stratum below it, the outer stratum alone would be too limp to provide the soft feel without excessive matting (i.e., compressing to a shallow-pile, flat surface) under normal service conditions. In like manner, different strata materials can be selected to provide enhanced dirt barrier quality, abrasion resistance, coloring and other characteristics that would be difficult if not impossible for a textile fabric layer having a single or blended set of physical properties to offer. In a preferred embodiment, the textile laminate has a pile layer which comprises an exposed stratum of decorative fibers and a cushioning stratum of resilient fibers different from the decorative fibers the cushioning stratum being positioned between backing layer and the exposed stratum. In another preferred embodiment, the outer stratum consists essentially of warp yarns, the inner stratum is formed from stiffer or coarser warp yarns, a stiff film or another textile fabric and the adhesive component is in the form of bond lines similar to the pattern shown in FIG. 7.

Figure 10:
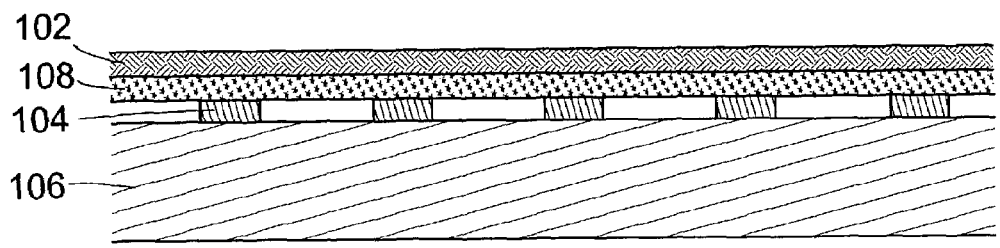
FIG. 10 is a schematic section view of a portion of a multilayer precursor to an embodiment of the novel textile laminate which includes an additional barrier layer positioned between the backing layer and the fibrous layer.
Figure 11:
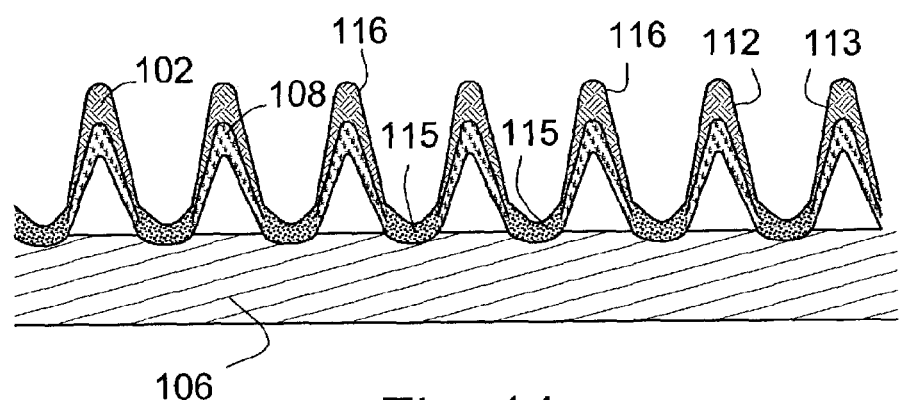
FIG. 11 is a schematic section view of the multilayer precursor of FIG. 10 after the backing layer has been contracted to provide an embodiment of the textile laminate in accord with the present invention which includes an additional barrier layer positioned between the backing layer and the fibrous layer.

Another preferred embodiment of the textile laminate includes an additional layer that blocks penetration of certain contaminating substances below the pile layer. Such an embodiment is seen in FIGS. 10 and 11. FIG. 10 shows a cross section of a precursor assembly of layered materials utilized to form the textile laminate shown in FIG. 11. The layers making up the laminate are a textile fabric layer 102, a backing layer 106 and an adhesive component, 104. There is also an additional layer 108 of penetration blocking material positioned between the adhesive and the textile fabric layer.

FIGS. 10 and 11 also illustrate an embodiment of this invention in which the adhesive component is in a discontinuous form. More particularly the adhesive component is a pattern of discrete droplets in the un-activated state. These droplets are spaced apart on a surface of the backing layer according to a randomized or ordered pattern bonding geometric scheme. Activation of this adhesive form can be accomplished by a uniform activation method, such as by applying heat and/or pressure over the whole area of the laminate precursor. After activation of the adhesive, the textile fabric layer and the additional layer are anchored to the backing layer only at the bonding points 115, which are shown greatly exaggerated. Normally, the piles 116 are spaced closely together after shrinking of the backing layer, and preferably, opposite facing sides 112 and 113 of neighboring piles contact each other. Between bonding points the textile fabric and additional layer separate from the backing layer and form pile structure that protrudes in the z-direction relative to the plane of the contracted backing layer.

The additional layer can be a continuous film that is impenetrable to solids and serves as a blocking layer to prevent penetration of dust, dirt and other fine particulate contaminants from descending into or below the backing layer 106. The blocking layer can also be a dense or coated fabric or membrane which is effective to resist the penetration of solid particles greater than particles size of about 10 μm. In another aspect, layer 108 comprises a barrier material which is penetrable by vapor and is impenetrable by liquid. Thus the novel textile laminate has the ability to ventilate the substrate which the laminate covers but resists transmission of liquids through the laminate to contact the substrate.

In another aspect the present invention provides a novel method of forming a textile laminate with a pile-like textile fabric outer layer. Simply stated, the method calls for first providing a flat backing layer composed of an irreversibly shrinkable material. The backing layer material is provided in its un-contracted state, i.e., before shrinking. Then an adhesive component is placed on a surface of the backing layer and a textile fabric pile layer fabric is positioned on the adhesive component to form a three layer composite in which the adhesive component is sandwiched between the backing layer and the pile layer fabric. The pile layer fabric is formed of substantially non-shrinkable fibers.

At this stage the adhesive component is activated in a manner effective to pattern bond the pile layer fabric to the backing layer. That is, the adhesive is activated only at discrete bonding points of the area of the interface between the pile layer fabric and the backing layer and the bonding points are laterally separated from each other. The effect of activating the adhesive component is to attach the pile layer fabric to the backing layer at the bonding points and to maintain detachment between the pile layer fabric and backing layer in the interfacial areas where the adhesive component is not activated. Thereafter, the backing layer is made to shrink by 25% or more in at least one direction parallel to the surface of the backing layer, that is, the plane defined by the flat backing layer. The backing layer may shrink in all directions, however, it is important that the lateral contraction take place so that the bonding points move toward each other while the backing layer retains its generally flat conformation. A consequence of the lateral contraction of the backing layer is that the pile layer fabric attached to the backing layer at the bond points also move with the backing layer. However, the pile layer fabric between the bond points does not shrink and separates from contact with the backing layer surface. The separation between the bonding points is large enough that as the contraction increases, the fibers of the pile layer fabric buckle, typically at about mid-span between the bonding points. The buckled fibers cause the fabric to form loops that protrude substantially normal to the plane of the backing layer, thereby providing a pile-like structure pattern bonded to the backing layer.

The pattern bonding of the pile layer fabric to the backing layer can be done in various conventional ways. For example, the adhesive component can be deposited at the interface between the fabric and backing layers only at the preselected bonding points by techniques such as dusting, spraying, dripping, and printing dry or liquid adhesives onto one or both of the interfacial surfaces. Hence the bond pattern is defined by the positions of the bonding points where the adhesive is located, as seen in FIG. 10. When the adhesive is deposited in this manner, it may be applied in either the unactivated or activated state. For example, a liquid chemical contact adhesive can be deposited while adhesively enabled. When the pile fabric and backing layers are positioned against each other, the contact adhesive immediately joins the two layers. In another example, solid pressure sensitive or hot melt adhesive particles can be deposited prior to being activated. Later, pressure and/or heat will be applied to activate these adhesives.

In another contemplated variation, the adhesive component can be applied as a continuous layer between the pile fabric and backing layers. For example, the adhesive component can be a film positioned between the pile fabric and backing layers or a coating applied coextensively to one or both interfacial surfaces of these layers. When in the form of a continuous layer, the adhesive component should be applied prior to activation of the adhesive so that the pile layer fabric is not bonded to the backing layer at other than preselected, laterally separated bonding points. The coating can be applied by such methods as spraying, doctoring, dipping, painting, printing, roller coating and the like. At the appropriate time, the continuous layer of adhesive can be activated to form the pattern bond by techniques suitable to the type of adhesive. For example, for a pressure sensitive adhesive, pressure can be applied at the bonding points by compressing the composite of pile fabric layer/adhesive component layer/backing layer between opposing embossing plate and backup tool in which the embossing plate has protrusions at positions corresponding to the bonding points. This embossing can be performed with or without heating. For a thermally activating adhesive component, the embossing should be accompanied by heating to an elevated temperature effective to activate the adhesive. However, the heating should not degrade the materials of the other layers of the product and should not cause the backing layer to shrink until the pattern bond is completed. Thermal pattern bond methods that are suitable for use with this invention are disclosed in my companion patent application Ser. No. 10/307,186 filed Nov. 29, 2002, incorporated herein by reference.

The step of shrinking the backing layer is carried out by any method suitable to cause the backing layer material to contract to the desired extent. Usually, shrinking is accomplished thermally by subjecting the composite to an elevated temperature, i.e., by heat shrinking. The heat shrinking temperature preferably should not overlap the activation temperature of a thermally activated adhesive, especially thermoplastic hot melt adhesives which can flow and thus destroy the pattern bond at excessive temperatures. Heat shrinking should not take place at temperatures that will degrade the pile fabric, the backing layer or other materials in the composite. A preferred method of shrinking the backing layer is to pass the composite through a conventional oven, such as one heated by convection, radiation or a combination thereof.

It is desirable to completely shrink the backing layer to its ultimate contracted dimensions in the textile laminate fabrication process. This helps to assure that the product will not shrink further due to environmental conditions to which it is exposed during use. The precaution of completely shrinking the backing layer is not critical particularly if the product is not expected to have exposure to shrinking conditions during its service life. Therefore, a backing layer that heat shrinks at very high temperature can be contracted to a partial extent prior to use when the product will not be heated in service to temperatures that approach the heat shrinking temperature.

Pile-like textile laminates described above that contain multiple strata in the pile fabric layer and/or additional barrier and blocking layers can be fabricated in similar manner. That is, the additional strata and layers are assembled in appropriate juxtaposition to form a composite. Then the adhesive is activated to form a pattern bond, and finally, the backing layer is contracted to create the pile-like effect. The adhesive should be effective to bind together all of the layers in the composite at the bonding points. Larger proportions of adhesive or more aggressive adhesive activation conditions may be used when the number of component layers to be bound increases. If a barrier layer is employed between the outer pile layer fabric and the underlying backing layer, it may be useful to have an adhesive component applied to each interfacial surface to assure a good bond. That is, a first adhesive component can be applied between the pile layer fabric and one side of the barrier layer, and a second adhesive component can be applied between the opposite side of the barrier layer and the backing layer. One of ordinary skill in the art will be able from this disclosure to identify effective conditions for pattern bonding and shrinking the textile laminate without undue experimentation.

EXAMPLES

This invention is now illustrated by examples of certain representative embodiments thereof, wherein all parts, proportions and percentages are by weight unless otherwise indicated. All units of weight and measure not originally obtained in SI units have been converted to SI units. The entire disclosures of U.S. patents named in the following examples are hereby incorporated by reference herein.

Example 1A

Monolithic, Dirt-blocking Textile Fabric Layer, Thermally-Fused Laminate

A textile fabric precursor for the pile layer was formed from a blend of 75% 3 denier polyester 3.8 cm (1.5 inch) staple fibers and 25% 1.5 denier polypropylene 3.8 cm (1.5 inch) staple fibers. These fibers were carded, crosslapped and densely needle punched using 186 penetrations per $cm^2$ (1200 per square inch) per side to form a felt having basis weight of 272 $g/m^2$ (8 oz./sq. yard). The felt was processed through a flat calender at 27 m/min. (90 ft./min.) at 155° C. and 180 kg/cm (1000 lbs/linear inch). This produced a thin, coherent, durable fabric with a surface feel and high surface stability. The pile layer fabric was 0.9 mm thick and had a density of 0.3 $g/cm^3$.

The adhesive layer was a continuous, 0.114 mm (0.0045 inch) thick sheet of polyethylene.

The backing layer was a 20 $g/m^2$ dense polypropylene nonwoven fabric stitchbonded with heat shrinkable POY polyester yarns. The stitching was 14 gauge, 7.1 counts per cm (18 counts per inch) using front bar 1-0,0-1 chain stitching chain and back bar 0-0,4-4 laid pattern. The resulting fabric was capable of shrinking by a factor of 1.8–2.1 in both machine and cross machine directions when heated to temperatures above 100° C.

The pile layer textile fabric precursor, adhesive layer and backing layer were continuously unwound from supply rolls and overlayed in that order. The composite was inserted into the nip between a heated embossing roll and a flat backup roll. The embossing roll had truncated conical projections of 2.3 mm (0.090 inches) tall, 2.3 mm (0.090 inches) diameter at the base and 1.8 mm (0.070 inches) diameter at the tip. Projections were spaced in a 0.85 cm (⅓-inch) staggered pattern with an area density of 1.39 projections $cm^2$ (9 per sq. inch). The tips of the embossing roll were heated to 200° C. and the composite was moved between the embossing and backup roll at 2.7 m/min. (9 ft./min) to form an intermediate product. Examination of the intermediate product showed that there was little melting or stiffening of the textile fabric pile layer between the bond points. The backing layer was unaffected by the bonding process except that the textile fabric pile layer, adhesive and backing materials were fully consolidated together at the bond points. Bond points were sectioned and measured as about 0.3 mm thick. Overall thickness of the intermediate was about 2.1 mm.

A 25 cm×25 cm (10 inch by 10 inch) piece of the intermediate was placed with the backing layer adjacent to the surface of an unheated hot plate and covered with a sheet of polytetrafluoroethylene. The hot plate was energized such that the surface temperature was gradually raised from room temperature to 200° C. in 3.5 minutes after which the laminate was removed from the hot plate to cool to ambient temperature. The product contracted to 13.2 cm (5.2 inches) in the machine direction by 12.7 cm (5.0 inches) in the cross machine direction and the textile fabric layer had buckled outward from the backing layer to form pile-like loops laterally offset at a pitch of about 2.2 per cm (5.5 per inch). The adhesive film contracted and concentrated toward the bond points. Tension caused the film to break to leave open areas between the bond points. Overall thickness from the back side of the backing layer to the peaks of the pile layer was about 3.5 mm. Calculated on the basis of area shrinkage, weight of the pile layer and pile density after shrinkage were about 1050 $g/m^2$ and about 0.3 $g/cm^3$, respectively.

Dirt block testing was performed by spreading evenly over the surface of the textile laminate 100 g of dust and dirt taken from the filter of a vacuum cleaner after cleaning the floors of commercial office space. An equal area size piece of a control sample of loop pile commercial carpet of tufted polypropylene having 1020 g/m² weight was placed pile-to-pile onto the dirt-covered product sample. The dirt was worked into the carpets. This was done by keeping the product and control samples in mutual contact and dropping the sandwiched assembly onto a table top with slight force. The assembly was picked up, turned 180° and dropped again. The turning and dropping sequence was repeated for a total of ten times in quick succession. The carpets were separated and the dirt retained on each sample was determined by weigh gain. The product sample had 28 grams and the control had 64 grams. The product and control were placed next to each other pile side up on a flat vinyl floor. The samples were held to the floor with double-sided adhesive tape. A vacuum cleaner with a carpet cleaning nozzle was drawn over both samples for about 10 passes. The samples were weighed again to reveal that the vacuuming had removed all but 1.5 g (5.4%) of the dust from the product and 11.8 g (18.4%) from the control. The procedure was repeated three additional times by adding dirt, sandwiching the samples, working in the dirt and vacuuming. In these trials, the weight of dust retained by the product sample was 1.6 g for all and the dust weight for the controls was 18.5 g, 21.2 g and 27.8 g.

Example 1B

Monolithic, Dirt-blocking Textile Fabric Layer, Thermoset-Adhesive Laminate

A 0.8 mm thick, cotton denim weighing 417 g/m² was used as the fabric for the pile layer. This fabric had a twill weave of 50×60 per inch and density of 0.52 g/cm³. The adhesive was an acrylic cement (DUCO brand). The same backing layer material as in Ex. 1A was used.

Drops of about 0.025 g/drop of adhesive were placed on the backing in the same 1.2/cm (3/inch) staggered pattern as the embossing tips in Ex. 1A. Then the denim was placed on the backing with the adhesive between the pile layer and backing. The composite was compressed in a platen press at 6.9 MPa (1000 lbs/in²) pressure and 75° C. for 1 minute. The compression forced the adhesive into both the backing and textile fabric layers to form bond points of about 2.4 mm diameter and 0.75 mm thickness. Overall thickness of the laminated product was about 1.4 mm.

A 10 cm×10 cm (4 inch×4 inch) piece of the laminated product was heat shrunk using the same process as in Ex. 1A to a final size of about 5 cm×5 cm (2 inch×2 inch). The lateral shrinkage caused the denim to buckle to form a pile-like layer of 3.2 mm thickness, calculated weight of 1100 g/m² and density of 0.35 g/cm³.

The dirt blocking test described in Ex. 1A was repeated with the same control sample except that the sample specimens were 5 cm×5 cm (2 inch×2 inch) and the amount of dirt and dust loading was reduced to 10 g. Results of four repetitive trials were as follows:

| Trial No. | Ex. 1B retained dirt (g) | Control retained dirt (g) |
|---|---|---|
| 1 | 0.1 | 0.5 |
| 2 | 0.1 | 1.1 |
| 3 | 0.2 | 1.5 |

Example 2

Laminate Having Supplemental Dirt-Blocking Layer

Two 25 cm (10 inch) square pieces of the polyethylene film (Ex. 1A) were placed on the same side of a similar sized piece of the backing layer material used in that example. The assembly was placed onto a metal plate with the backing layer adjacent to the plate. A warp array of 3200 denier twisted nylon carpet yarns spaced at 7.9 yarns per cm (20 yarns per inch) was wrapped in the machine direction around the assembly and plate to form a textile fabric precursor of about 11.1 mm thickness. Weight of the textile fabric layer was about 276 g/m². An embossing tool was provided with linear protrusions aligned parallel in the cross machine direction. The protrusions were 2.5 mm (0.10 inch) high, extended 2 mm (0.080 inch) in the machine direction were spaced apart by 12.5 cm (0.500 inch). The embossing plate was heated to 200° C. and then pressed against the assembly from the yarn side toward the metal plate with a pressure of 3.4 MPa (500 lbs/inch²) for 2 seconds of contact. The embossing caused the yarns to embed fully within molten polyethylene at the bond points and the molten polyethylene penetrated to the side of the backing layer in contact with the metal plate. The upper layer of polyethylene (i.e., nearer to the yarns) had ruptured in most locations between the bond points, however, the lower polyethylene layer (i.e., closer to the backing layer) appeared from visible inspection to be intact.

The yarns extending below the metal plate were cut off. The laminate was then heat shrunk by the same procedure as in Ex. 1A. This reduced the size of the piece to 5.2 inches in the machine direction and 5.3 inches in the cross machine direction. The yarns and intact film buckled as a consequence of the shrinking and formed a pile like layer with a dirt, dust and liquid impenetrable liner between the yarns and the backing. After shrinking the pile height was 4.6 mm, the pile weight, based only on yarns was 1000 g/m², and the pile density, based only on yarns was 0.22 g/cm³. The dirt blocking test as in Ex. 1A was repeated with the sample of Ex. 2 and results were as follows:

| Trial No. | Ex. 1B retained dirt (g) | Control retained dirt (g) |
|---|---|---|
| 1 | 3.7 | 13.2 |
| 2 | 4.3 | 17.8 |
| 3 | 4.6 | 23.5 |
| 4 | 4.7 | 28.6 |

Water impenetrability was tested by placing the backing layer side of a sample of the composite onto a piece of absorbent paper and pouring about 3 g of water onto the pile layer. After about an hour no wetness was detected in the absorbent paper.

Example 3

Multilayer Laminate Including Stratified Pile Layer

The procedure of Ex. 1A was repeated except that an additional support layer of carded blend of 85% polyester 15.0 denier, 7.5 cm (3 inch) long staple fibers and 15% polypropylene 1.5 denier, 3.8 cm (1.5 inch) long staple fibers was provided. The batt was lapped to 0.27 kg/m² (8 oz./yd²), and needled lightly with 23 penetrations per cm² (150 penetrations per square inch). The support layer was placed between the adhesive layer and the outer textile fabric layer prior to lamination. After lamination the bond points were about 0.4 mm thick and the height of the piles above the backing layer was about 2.6 mm. The adhesive between the bond points contracted and broke open to expose the support layer to the backing layer. The heat shrinking procedure as in Example 1A was utilized to reduce the 25 cm×25 cm (10 inch by 10 inch) laminate to 14 cm (5.7 inches) in the machine direction and 16 cm (6.3 inches) in the cross machine direction. The pile layer thickness had increased to 3.5 mm and the pile layer had a noticeably higher resilience to the touch than that of Ex. 1A. Each of the outer pile layer and the support layer weighed 760 g/m², and had a density of 0.22 g/cm³. The pile layer was 3.5 mm above the backing layer in the contracted product. The support layer was masked from view by the outer pile layer.

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A method of making a textile laminate comprising the steps of
    (a) providing a material for a backing layer defining a first side of the laminate and having a substantially flat surface opposite the first side, the material being adapted to shrink in at least one dimension parallel to the surface,
    (b) providing a textile fabric precursor for a pile layer defining a second side of the laminate, the textile fabric precursor comprising substantially non-shrinkable fibers,
    (c) positioning the textile fabric precursor coextensively with the material,
    (d) placing an adhesive component between the material and the textile fabric precursor,
    (e) placing a continuous film blocking layer that is a barrier to dust and dirt particles between the textile fabric precursor and the backing layer,
    (f) activating the adhesive component to form a pattern of bond points between the backing material and the textile fabric precursor, and
    (g) maintaining the continuous blocking layer in direct contact coextensively with the pile layer and shrinking the material at least about 25% to form the backing layer and thereby moving the bond points toward each other to form the textile fabric precursor and adjacent blocking layer into a pile layer of loops of fibers protruding normal to the surface.

2. The method of claim 1 in which steps (d)–(f) collectively comprise positioning a thermally activating adhesive on the surface, and compressing the textile fabric precursor, the adhesive component, the continuous blocking layer and the backing layer between protrusions of an embossing tool and an opposing surface of a backup tool while simultaneously heating the adhesive component to a temperature effective to activate the adhesive and to form the bond points at discrete locations on the surface of the backing layer.

3. The method of claim 1 in which the adhesive component is positioned only at discrete locations on the surface.

4. The method of claim 1 in which the loops protrude away from the backing layer substantially normal to the plane to a height above the bond points in the range of about 3–10 mm and the pile layer has a weight of about 250–1200 g/m², and
    in which the textile fabric precursor comprises fibers in the range of about 0.1 to about 10 denier per filament, has a density of about 0.1–0.4 g/cm³, and has a weight of about 40 to about 400 g/m².

5. The method of claim 1 in which the shrinking step further comprises forming spaces between the pile layer and the backing layer intermediate the bonding points.

6. The method of claim 1 in which the activating step comprises embedding within the adhesive component all of the fibers of the textile fabric precursor coextensive with the bond points without distorting the fibers.

7. The method of claim 1 in which the blocking layer is a substantially impenetrable barrier to dust and dirt particles greater than about 10 μm.

8. The method of claim 1 in which the blocking layer is impenetrable to solids.

9. A method of making a textile laminate comprising the steps of
    (a) providing a material for a backing layer defining a first side of the laminate and having a substantially flat surface opposite the first side, the material being adapted to shrink in at least one dimension parallel to the surface,
    (b) providing a textile fabric precursor for a pile layer defining a second side of the laminate, the textile fabric precursor comprising substantially non-shrinkable fibers,
    (c) positioning the textile fabric precursor coextensively with the material,
    (d) placing an adhesive component between the material and the textile fabric precursor,
    (e) placing a continuous blocking layer that is penetrable by vapor and not penetrable by liquid between the textile fabric precursor and the backing layer,
    (f) activating the adhesive component to form a pattern of bond points between the backing material and the textile fabric precursor, and
    (g) maintaining the continuous blocking layer in direct contact coextensively with the pile layer and shrinking the material at least about 25% to form the backing layer and thereby moving the bond points toward each other to form the textile fabric precursor and adjacent blocking layer into a pile layer of loops of fibers protruding normal to the surface.

10. The method of claim 1 or 9 in which the material of the backing layer is adapted to shrink irreversibly.

11. The method of claim 9 in which steps (d)–(f) collectively comprise positioning a thermally activating adhesive on the surface, and compressing the textile fabric precursor, the adhesive component, the continuous blocking layer and the backing layer between protrusions of an embossing tool and an opposing surface of a backup tool while simultaneously heating the adhesive component to a temperature effective to activate the adhesive and to form the bond points at discrete locations on the surface of the backing layer.

12. The method of claim 9 in which the activating step comprises embedding within the adhesive component all of the fibers of the textile fabric precursor coextensive with the bond points without distorting the fibers.

13. The method of claim 9 in which the adhesive component is positioned at discrete locations only on the surface.

14. The method of claim 9 in which the loops protrude away from the backing layer substantially normal to the plane to a height above the bond points in the range of about 3–10 mm and the pile layer has a weight of about 250–1200 g/m$^2$, and in which the textile fabric precursor comprises fibers in the range of about 0.1 to about 10 denier per filament, has a density of about 0.1–0.4 g/cm$^3$, and has a weight of about 40 to about 400 g/m$^2$.

15. The method of claim 9 in which the shrinking step further comprises forming spaces between the pile layer and the backing layer intermediate the bonding points.

* * * * *